United States Patent
Clemens et al.

[11] Patent Number: 5,100,311
[45] Date of Patent: Mar. 31, 1992

[54] COIL LOCATOR FOR MOLD ENCAPSULATION

[75] Inventors: Douglas J. Clemens; Henry J. Waring, both of Garrett, Ind.

[73] Assignee: Dana Corporation, Toledo, Ohio

[21] Appl. No.: 586,651

[22] Filed: Sep. 21, 1990

[51] Int. Cl.⁵ .............................................. B29C 33/12
[52] U.S. Cl. ................................ 425/110; 249/91; 264/272.150; 264/272.200; 336/196
[58] Field of Search ................. 336/196, 196, 208; 249/91; 264/272.15, 272.19, 275, 272.2; 425/123, 124, 129.1, 110

[56] References Cited

U.S. PATENT DOCUMENTS

| | | | |
|---|---|---|---|
| 2,800,731 | 7/1957 | Carson | 249/91 |
| 2,914,600 | 11/1959 | Smith et al. | 264/272.19 |
| 2,988,715 | 6/1961 | Gizynski | 336/96 |
| 3,205,386 | 9/1965 | Henschke et al. | 336/208 |
| 3,210,701 | 10/1965 | Fastner et al. | 336/96 |
| 3,471,986 | 10/1969 | Swenson | 249/91 |
| 3,525,966 | 8/1970 | Wierzbinski | 264/272.19 |
| 4,542,362 | 9/1985 | Beisser | 336/208 |
| 4,754,250 | 6/1988 | Duin | 336/208 |
| 4,769,198 | 9/1988 | Bechtold et al. | 249/91 |
| 4,983,866 | 1/1991 | Lok | 425/117 |
| 4,988,472 | 1/1991 | Orimoto et al. | 264/275 |

Primary Examiner—Jay H. Woo
Assistant Examiner—W. J. Matney, Jr.
Attorney, Agent, or Firm—F. B. McDonald

[57] ABSTRACT

A mold locator is adapted to support and position a wound electromagnetic coil within a mold for encapsulation of the coil by dielectric media. In one preferred form, the locator includes an annular central body having arms extending radially from the central body. In addition to having a pair of stiffening ribs extending along the sides thereof, each arm incorporates a channel for carrying a wire lead. The central body is annular in shape and defines an interior wall having a plurality of radially extending detents adapted to make point contacts with a centering arbor in the mold. Similarly, each radially extending arm of the mold locator incorporates at least one detent adapted to make a point contact with the floor or bottom of the mold cavity. Collectively, the detents operate to limit surface contact between the locator and the internal surfaces of the mold.

12 Claims, 1 Drawing Sheet

COIL LOCATOR FOR MOLD ENCAPSULATION

BACKGROUND OF THE INVENTION

This invention relates generally to the manufacture of encapsulated electric coils for use in electromagnetic devices. More particularly, the invention relates to the positioning and support of such coils within molds for encapsulation by dielectric media.

One major drawback of prior art mold locators is their general inability to maintain relatively minor or minimal contact(s) with the interior surfaces of the molds in which they are utilized. To the extent that all locators must be supported within their molds, most locators at best are only able to limit the nature of such contact(s) to a "line". Each of such lines represents an inherent weakness in system integrity and is commonly referred to as a "fault" line. Ideally, there would be no contact between the locator and the mold surface, in which case there would be no possibility of leakage through the encapsulation material due to manufacturing faults. Although most dielectric encapsulation materials in use today are designed for assuring maximal integrity of a coil, the mechanical methods available to assure such integrity have failed to keep pace with improvements in materials. What is needed is a more dependable, less fault-prone, mechanical system for enhancing integrity of encapsulated coils during their manufacture.

SUMMARY OF THE INVENTION

This invention provides a new mold locator which offers a mechanical improvement for enhancing integrity of coil encapsulation. In one preferred form, the locator is in the form of a star-shaped member having an annular central body which contains arms extending radially outwardly of the central body.

In one preferred form, three such arms are utilized, each extending symmetrically with respect to one another. Each arm has a channel which extends radially along its length. Integral stiffening ribs disposed along the sides of each arm operate to prevent angular distortion of the arms under the weight of a coil.

The central body contains a cylindrical interior wall which defines a longitudinal axis through the body. The wall includes a plurality of radially extending locator detents having ends adapted for making point contacts with a centering arbor of the mold. In addition, each of the arms of the mold locator contains at least a pair of symmetrically disposed locator detents, each also adapted to make a point contact with the mold.

Finally, the locator is formed of a material having sufficient strength to avoid compressive deflection and bending under the weight of the coil while subjected to elevated temperatures of the mold process.

BRIEF DESCRIPTION OF THE DRAWINGS

FIG. 3, however, representing the arm after coil encapsulation, wherein the arm is shown to include a wire lead passing through its channel.

DETAILED DESCRIPTION OF PREFERRED EMBODIMENTS

Figure 1:
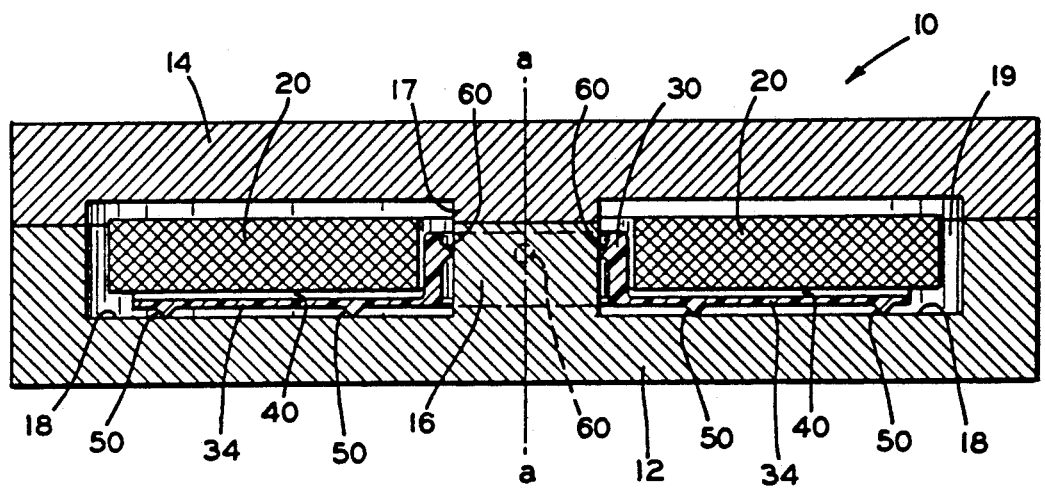
FIG. 1 is a cross-sectional side view of an injection mold apparatus prior to encapsulation of a coil contained therein, the apparatus including a preferred embodiment of a mold locator of the present invention, wherein the view of the mold locator is taken along lines 1—1 of FIG. 2.

Referring initially to FIG. 1, an injection mold apparatus 10 includes a lower mold portion 12. The mold portion 12 defines an annular interior cavity 19 adapted to support and contain an electric coil 20 for dielectric encapsulation of the coil. An upper mold portion 14 is tightly secured to the mold portion 12 prior to injection of encapsulation material into the cavity 19.

The mold portion 12 includes a cylindrical centering arbor 16 which extends vertically along the axial centerline "a—a" of the mold as shown. A sealing element 17 of the upper mold portion 14 mates tightly with the arbor 16 to assure that the encapsulation material fills only the annular interior cavity 19 of the mold apparatus 10. The mold portion 12 has a floor 18 which supports an annular mold locator 30 for positioning and supporting the coil 20. In the embodiment shown, the electric coil is annular in shape, although rectangular and other coil shapes may be employed.

Figure 2:
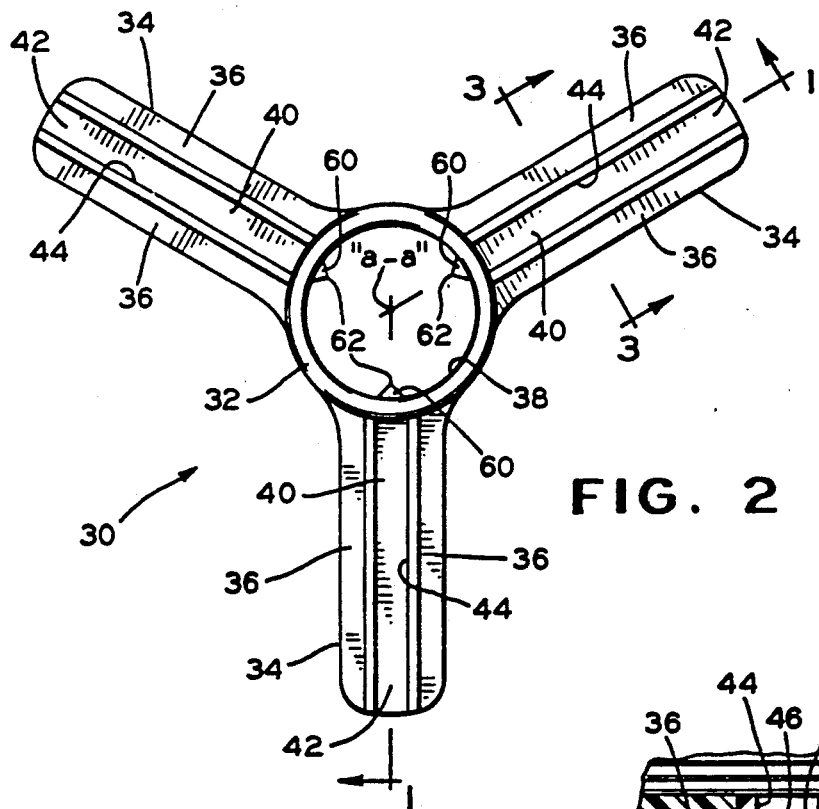
FIG. 2 is a plan view of a preferred embodiment of the mold locator of the present invention, shown separately.
Figure 3:
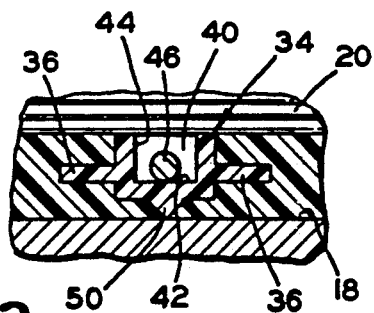
FIG. 3 is a cross-section of one of the arms of the mold locator as viewed along lines 3—3 of FIG. 2.

Referring to FIG. 2, the mold locator 30 is shown separately for clarity. The locator incorporates an annular central body 32 from which a plurality of arms 34 extend radially outwardly as shown. Referring also to FIG. 3, it will be appreciated by those skilled in the art that stiffening ribs 36, integral to and extending along the radial lengths of each arm 34, provide rigidity as necessary to avoid distortion of the arms under the weight of the coil 20 prior to encapsulation.

Each arm also contains a channel 40 which extends along its radial center. Each channel includes a base 42 along which may be carried a wire lead 46 from the coil for accommodating direct electrical connection to the encapsulated coil. Each base 42 is bounded by a pair of interior side walls 44 as shown in FIG. 3.

The center body 32 of the mold locator 30 incorporates an interior cylindrical wall 38 which when in the mold apparatus will be centered about the axis a—a. The wall 38 contains a plurality of detents 60 which extend radially for engagement with the centering arbor 16 (FIG. 1). Each detent defines a relatively pointed end 62 adapted for making a point contact with the arbor 16. Similarly, each arm 34 along its base incorporates a pair of detents 50 as shown in FIGS. 1 and 3. Analogous to ends 62 of the detents 60 on the center body interior wall 38, each detent 50 of the arms 34 contains a relatively pointed end 52 adapted to make a point contact with the floor 18 of the mold portion 12.

Ideally, each detent has the shape of a cone, with the base thereof attached integrally to a surface (38 or 34) from which it extends. As a practical matter, each detent represents a frustoconical member which makes a small "surface" contact rather than a "point" contact per se. However, to the extent that the surface area is quite small, the latter contact is referred to as a point rather than surface. This position is consistent with the fact that most "line" contacts in this field are, in reality, surface contacts. The object is to make the "line" or "point" surface area as small as feasible for a given application.

Those skilled in the art will appreciate that via use of the above-described "point" contact detent system, mold integrity is inherently improved over that of the "line" contact mold locators of the prior art. Preferred dimensions for both sets of conical detents (50 and 60) will range from 15 to 90 thousandths of an inch in overall height, and radius of the base will equal the height for optimal size-strength characteristics. Thus, in the preferred configuration, the sides of the frustoconically shaped detents will converge at forty-five degree angles. The optimal dimensions of the detents in any given application will ultimately, however, be a function of (1) the "flowability" of the dielectrrc media being used to encapsulate a given coil, and (2) the absolute sizes of the specific coil and locators being employed. The present inventors were able to successfully reduce the diameter of the contact surfaces or "points" 52 and 62 of the detents to approximately 5 thousandths of an inch (in their latest mold locator prototypes in which the channel base 42 had a width of 30 thousandths of an inch).

Finally, in a preferred form, the mold locator is made of a temperature resistant plastic or other suitable dielectric material capable of withstanding mold temperatures, which may be as high as 500 degrees Fahrenheit. Such a material may in some instances be the same material as used to encapsulate the coil. A nylon without glass-fill is one preferred choice.

Although only one preferred embodiment has been detailed and described herein, the following claims are envisioned to cover numerous embodiments neither shown nor described.

What is claimed is:

1. In a mold locator adapted for supporting and positioning a wound electromagnetic coil within a mold for encapsulation of the coil by dielectric media, said locator including a central body defining a longitudinal axis, a plurality of radial arms extending from said central body, said arms adapted to engage a radially extending interior surface of said mold for support of said coil, said central body containing a cylindrical interior wall centered about said longitudinal axis, said interior wall including means adapted to engage an axially extending arbor fixed within said mold for centering said locator; and improvement wherein said means for centering said locator comprises a plurality of radially extending locator detents, each detent comprising an end, said end adapted for making a point contact with said arbor, each detent comprising a conical body having a base integrally attached to said interior wall, wherein each end extends from said wall, and wherein said point contact comprises the only physical contact of each detent prior to said encapsulation.

2. The mold locator of claim 1 wherein at least one of said arms comprises an axially extending locator detent having an end adapted for making a point contact with said mold interior, said detent comprising a conical body having a base integrally attached to said one arm, wherein said end extends from said arm, and wherein said point contact comprises the sole physical contact of said detent prior to said encapsulation.

3. The mold locator of claim 2 wherein said coil comprises at least one wire lead for external electric connection with said coil, wherein at least one of said arms comprises means for passage of said lead.

4. The mold locator of claim 3 wherein said means for passage of said lead comprises a channel extending radially along the length of said arm.

5. The mold locator of claim 4 wherein said arm comprises parallel sides, and wherein said arm further comprises a pair of radially extending, integral stiffening ribs positioned along said sides.

6. The mold locator of claim 5 wherein each of said arms comprises a pair of said axially extending detents, said detents being radially spaced apart along said arm, said detents being symmetrically arranged from arm to arm.

7. The mold locator of claim 6 wherein said plurality of radially extending detents adapted to engage said centering arbor are circumferentially spaced apart about said interior wall.

8. The mold locator of claim 7 wherein each of said detents comprises a frustoconical member.

9. The mold locator of claim 8 wherein said locator material comprises a dielectric composition.

10. The mold locator of claim 9 wherein said locator detents on both said central body and said arms range from 15 to 90 thousandths of an inch in overall height.

11. In a mold locator adapted for supporting and positioning a wound electromagnetic coil within a mold for encapsulation of the coil by dielectric media, said locator including a central body defining a longitudinal axis, a plurality of radial arms extending from said central body, said arms adapted to engage a radially extending interior surface of said mold for support of said coil, said central body containing a cylindrical interior wall centered about said longitudinal axis, said interior wall including means adapted to engage an axially extending arbor fixed within said mold for centering said locator; an improvement wherein at least one of said arms comprises a channel extending radially along the length of said arm.

12. The mold locator of claim 11 wherein said arm comprising said channel further comprises a pair of radially extending, integral stiffening ribs positioned along the sides thereof.

* * * * *